May 4, 1965 T. W. SHOE 3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 1

INVENTOR.
Theodore W. Shoe
BY Bacon & Thomas
ATTORNEYS

May 4, 1965 T. W. SHOE 3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 2

INVENTOR.
Theodore W. Shoe
BY
Bacon & Thomas
ATTORNEYS

INVENTOR.
Theodore W. Shoe
BY
Bacon & Thomas
ATTORNEYS

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 4

INVENTOR.
Theodore W. Shoe
BY Bacon & Thomas
ATTORNEYS

INVENTOR.
Theodore W. Shoe
BY
Bacon & Thomas
ATTORNEYS

May 4, 1965 T. W. SHOE 3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 6

INVENTOR.
Theodore W. Shoe
BY
Bacon & Thomas
ATTORNEYS

INVENTOR.
Theodore W. Shoe
BY
Bacon & Thomas
ATTORNEYS

INVENTOR.
Theodore W. Shoe
BY Bacon & Thomas
ATTORNEYS

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960

INVENTOR.
Theodore W. Shoe
BY Bacon & Thomas
ATTORNEYS

INVENTOR
Theodore W. Shoe
BY Bacon & Thomas
ATTORNEYS

May 4, 1965 T. W. SHOE 3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 11

INVENTOR.
Theodore W. Shoe
BY
Bacon & Thomas
ATTORNEYS

May 4, 1965 T. W. SHOE 3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Filed Sept. 9, 1960 13 Sheets-Sheet 12

INVENTOR.
Theodore W. Shoe
BY
Bacon & Thomas
ATTORNEYS

INVENTOR.
Theodore W. Shoe
BY
Bacon & Thomas
ATTORNEYS 3,182,144
Patented May 4, 1965

3,182,144

ELECTRIC LOCK HAVING SPACED APART CONDUCTIVE AREAS ADAPTED TO BE ELECTRICALLY CONNECTED WITH SPACED CONDUCTIVE AREAS ON AN INSERTABLE KEY

Theodore W. Shoe, 47 Tamplin Drive, Troy, Ohio

Filed Sept. 9, 1960, Ser. No. 54,899
14 Claims. (Cl. 200—46)

This invention relates to locks and locking systems, and more especially to electric locks in which keys complete locking and unlocking circuits.

It is an object of the invention to provide a novel circuit and electric lock in which the use of the proper key in its proper position effects an unlocking action, and the use of an improper key in any position, or the use of the proper key in an inverted position, effects a locking action.

It is a further object to provide a novel electric lock having locking and unlocking plates which can be easily and quickly removed and replaced by other locking and unlocking plates providing for different coded circuits, requiring different keys.

It is a further object of the invention to provide a novel electric lock including locking and unlocking plates and having different forms of springs, forming part of the circuit, some springs cooperating with the plates to form a locking circuit and other springs cooperating with the plates to form an unlocking circuit, the springs being replaceable, one form for another, to provide different locking and unlocking circuits.

It is a further object of the invention to provide a novel electric lock of the type described above of laminated form, having a central key receiving slot and having locking and unlocking plates above and below the slot.

With the following and other objects in view which will appear in the following description, the invention resides in the novel combination and arrangement of parts, and/or the details of construction hereinafter described and claimed, and illustrated in the accompanying drawings, in which:

FIGS. 1–11 and 13–36 illustrate a first embodiment of the invention, in which:

FIG. 1 is a plan view of the electric lock;

FIG. 2 is a longitudinal sectional view on the line 2—2 of FIG. 1;

FIG. 3 is a longitudinal sectional view on the line 3—3 of FIG. 1;

FIG. 4 is a longitudinal sectional view on the line 4—4 of FIG. 1;

FIG. 5 is a longitudinal sectional view on the line 5—5 of FIG. 1;

FIG. 6 is a top plan view of the top spring plate;

FIG. 7 is a top plan view of the bottom spring plate;

FIG. 8 is a top plan view of the key plate;

FIG. 9 is a top plan view of the top contact plate;

FIG. 10 is a top plan view of the bottom contact plate;

FIG. 11 is a longitudinal sectional view, similar to FIG. 4, showing a key within the slot in the key plate;

FIG. 13 is a top plan view of the top unlocking plate in which the outline of the plate is shown in phantom lines and the conductive areas, which are on the bottom face, are shown in solid lines as they would appear looking down from the top, to facilitate an understanding of the circuit;

FIG. 14 is a similar view of the top locking plate;

FIG. 15 is a top plan view of the key plate with a properly coded key correctly positioned therein;

FIG. 16 is a diagrammatic illustration of the sectional view of FIG. 3 showing the electrical circuit;

FIG. 17 is a similar illustration of the sectional view of FIG. 4;

FIG. 18 is a similar illustration of the sectional view of FIG. 5;

FIG. 19 is a top plan view of the bottom locking plate;

FIG. 20 is a top plan view of the bottom unlocking plate.

FIGS. 21–28 show a modified circuit of the first embodiment, in which:

FIG. 21 is a top plan view, similar to FIG. 13, showing a modified form of top unlocking plate;

FIG. 22 is a top plan view, similar to FIG. 14, showing a modified form of the top locking plate;

FIG. 23 is a plan view, similar to FIG. 15, showing a modified arrangement of inserts in the key to energize the unlocking circuit in the modified form shown in FIGS. 21–28;

FIG. 24 is a diagrammatic sectional view, similar to FIG. 16, of the modified circuit of FIGS. 21–28;

FIG. 25 is a diagrammatic sectional view, similar to FIG. 17, of the modified circuit of FIGS. 21–28;

FIG. 26 is a diagrammatic sectional view, similar to FIG. 18, of the modified circuit of FIGS. 21–28;

FIG. 27 is a top plan view of the modified bottom locking plate;

FIG. 28 is a top plan view of the modified bottom unlocking plate.

Figures 31, 34:
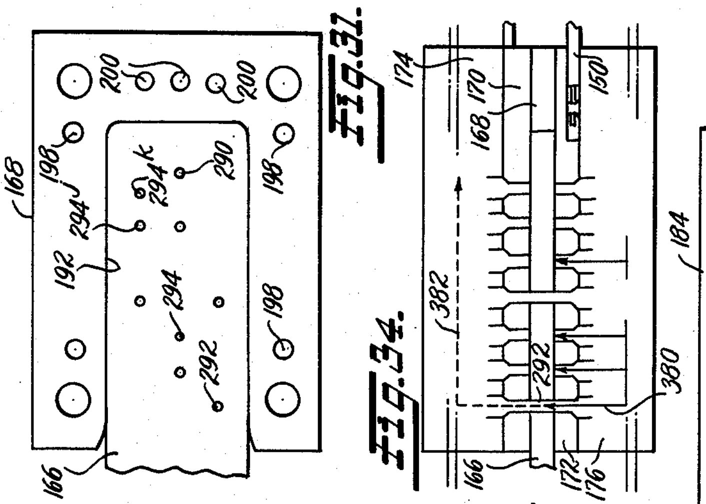
Figure 36:
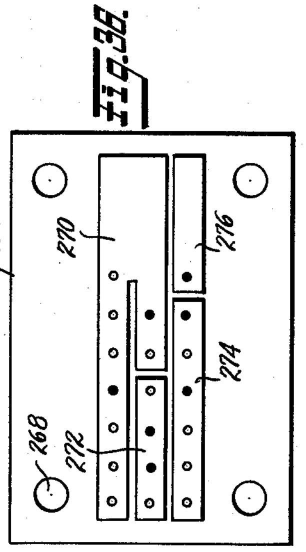
Figures 29, 30, 32, 33:
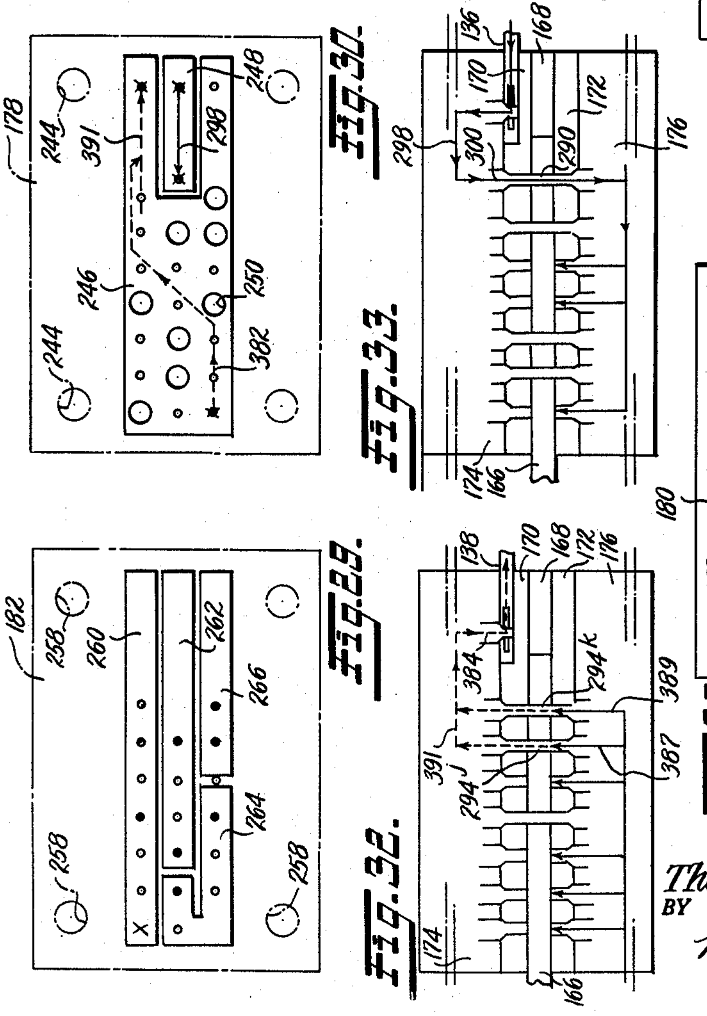
Figure 35:
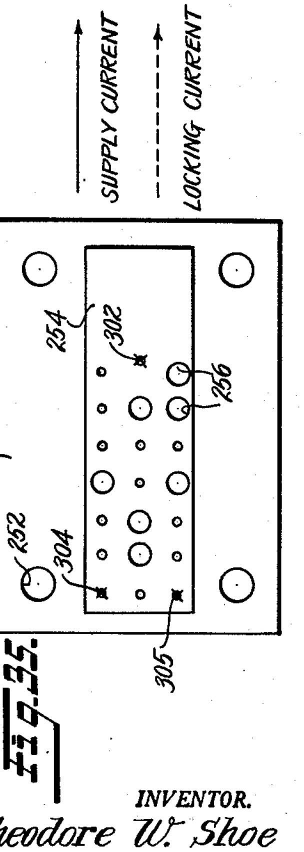

FIGS. 29–36 correspond to FIGS. 13 to 20, respectively, except that the key in FIG. 31 is shown in an inverted position to cause energization of a locking circuit.

Figures 37, 38, 39, 42, 43, 47, 48:
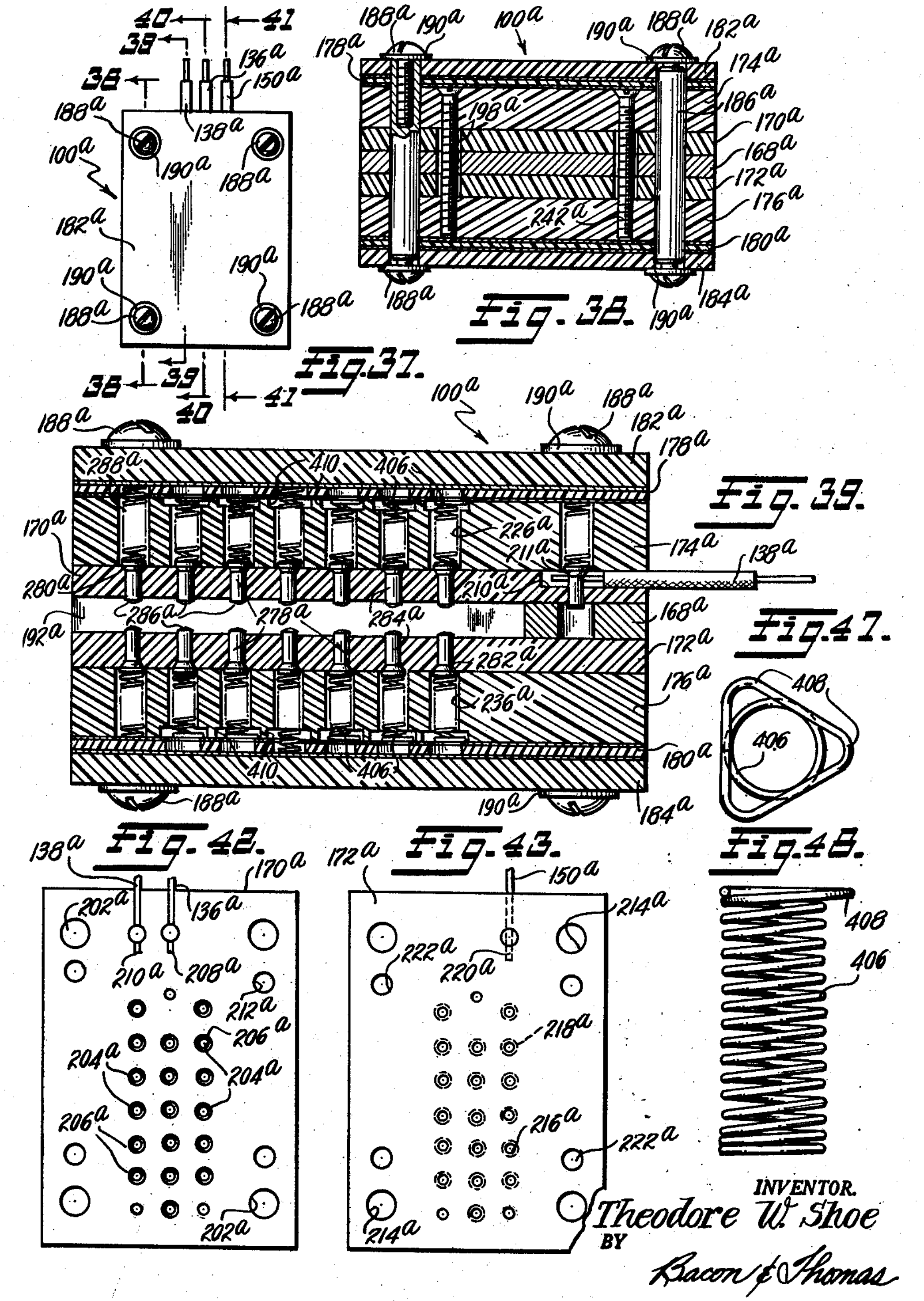
Figure 40:
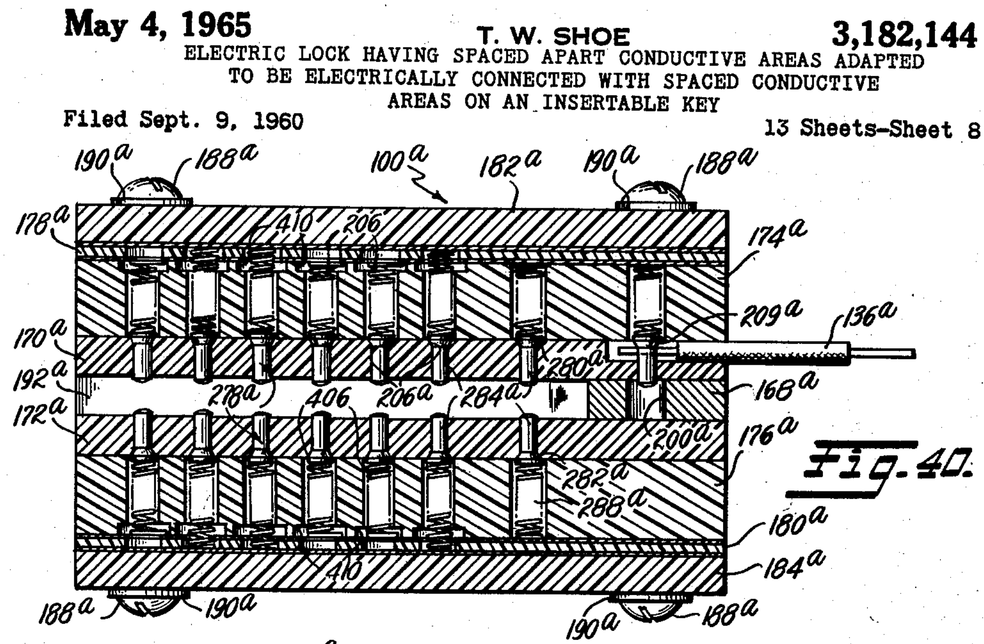
Figure 41:
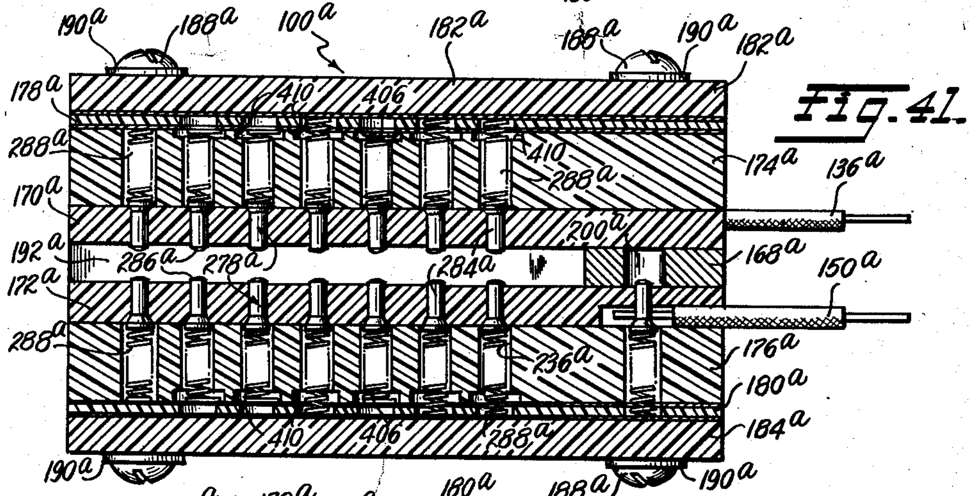
Figure 44:
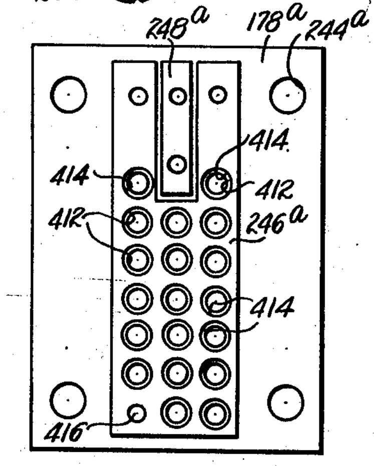
Figure 45:
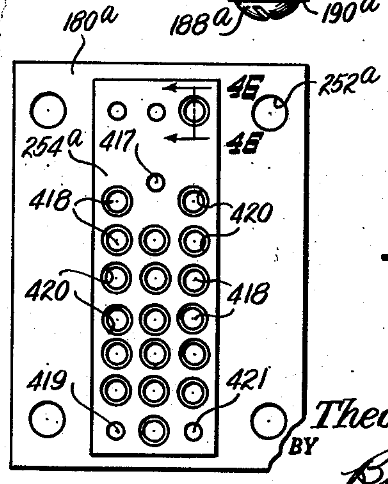
Figure 46:
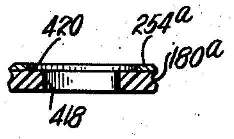

FIGS. 37 to 48, inclusive, illustrate a second embodiment of the invention, in which:

FIG. 37 is a plan view of the electric lock;

FIG. 38 is a longitudinal sectional view along the line 38—38 of FIG. 37;

FIG. 39 is a longitudinal sectional view along the line 39—39 of FIG. 37;

FIG. 40 is a longitudinal sectional view along the line 40—40 of FIG. 37;

FIG. 41 is a longitudinal sectional view along the line 41—41 of FIG. 37;

FIG. 42 is a top plan view of the top contact plate;

FIG. 43 is a top plan view of the bottom contact plate;

FIG. 44 is a bottom plan view of the top locking plate;

FIG. 45 is a top plan view of the bottom locking plate;

FIG. 46 is a sectional view through one of the openings in the locking plates taken on the line 46—46 of FIG. 45;

FIG. 47 is an end view of one of the spring conductors employed in this embodiment;

FIG. 48 is an elevation view of the spring conductor.

Figures 49, 50, 51, 52, 53, 54:
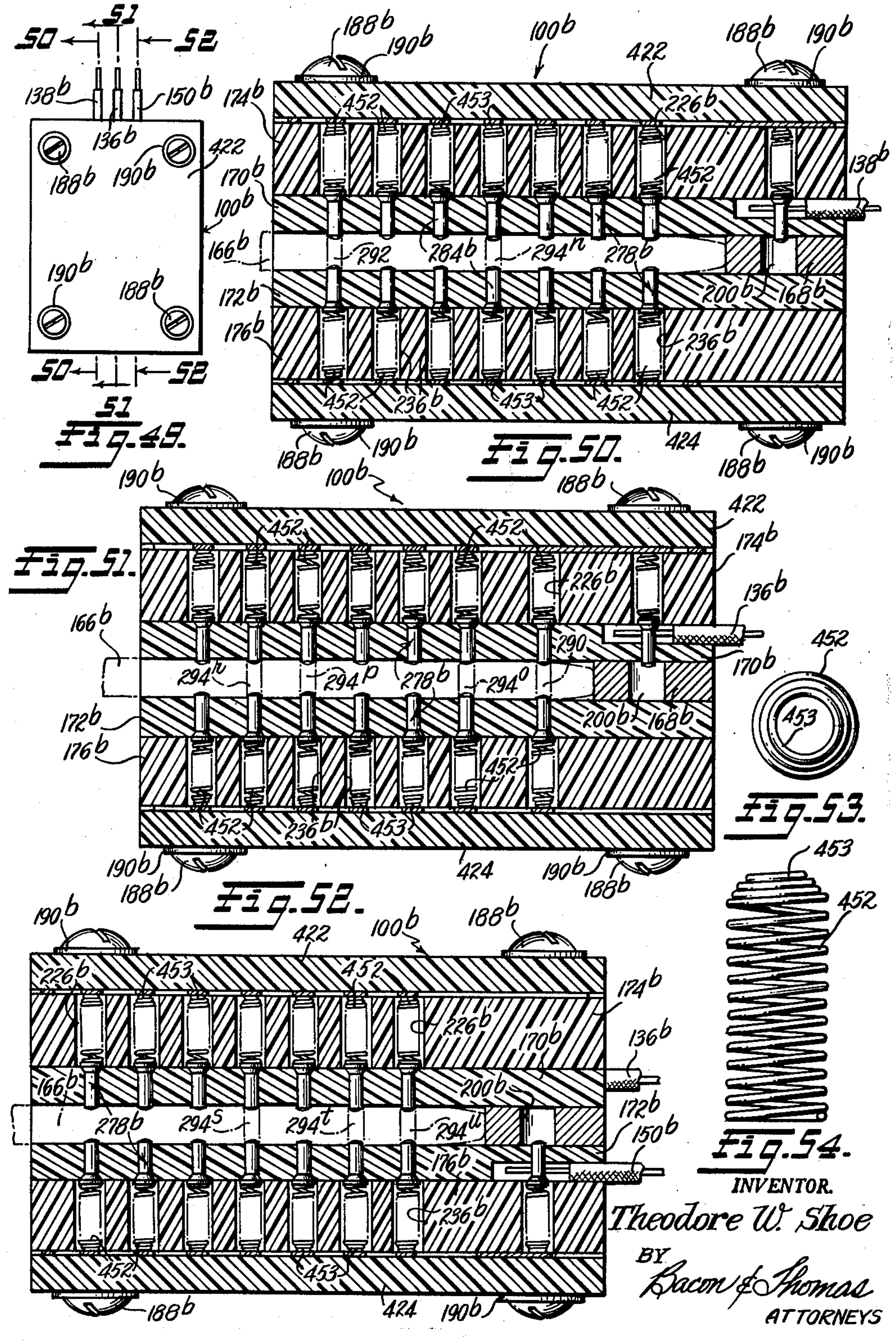
Figures 55, 56, 57, 58, 59, 60, 61, 62, 63:
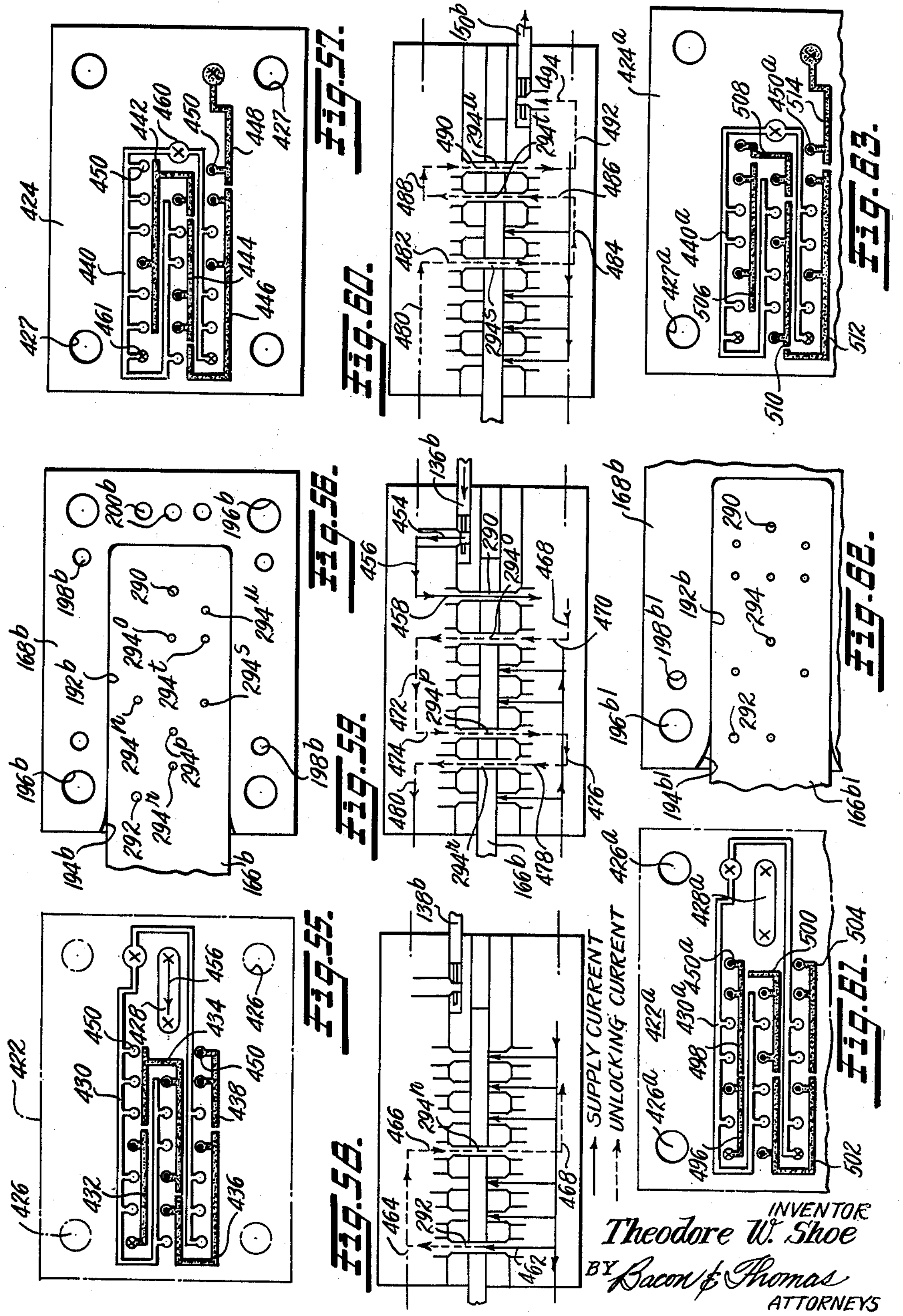
Figure 66:
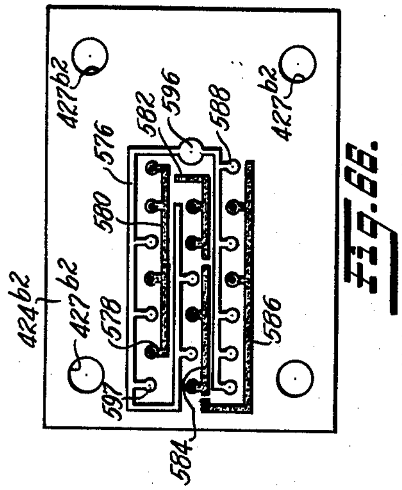
Figure 69:
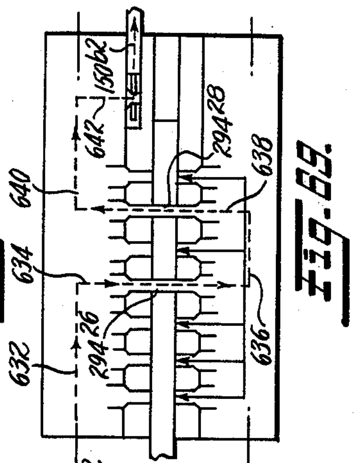
Figure 65:
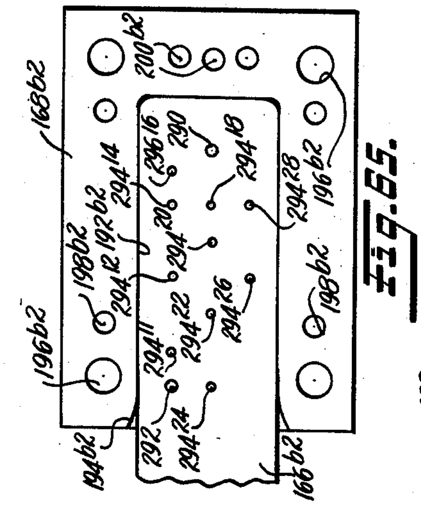
Figure 68:
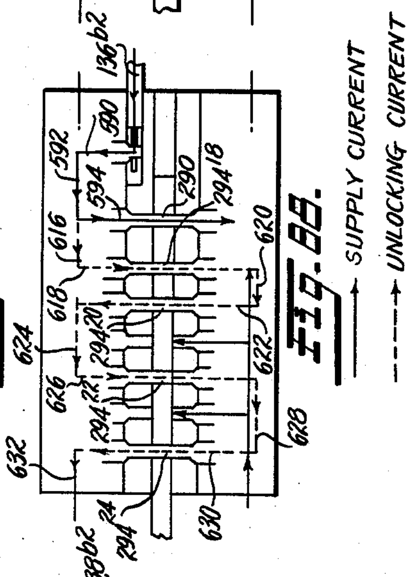
Figure 64:
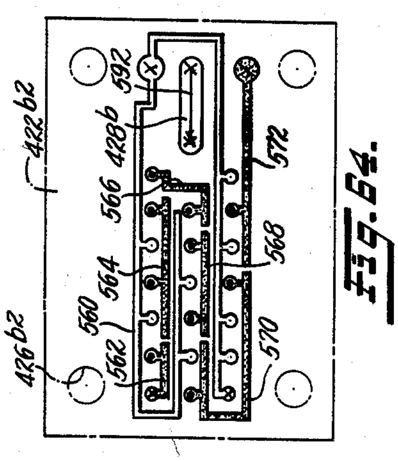
Figure 67:
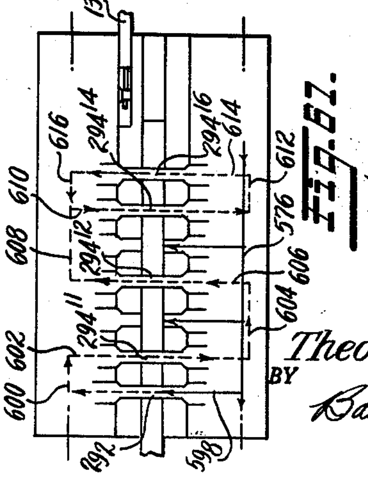

FIGS. 49 to 69 illustrate a third embodiment of the invention, in which:

FIG. 49 is a top plan view of the electric lock;

FIG. 50 is a longitudinal sectional view on the line 50—50 of FIG. 49;

FIG. 51 is a longitudinal sectional view on the line 51—51 of FIG. 49;

FIG. 52 is a longitudinal sectional view on the line 52—52 of FIG. 49;

FIG. 53 is a top plan view of one of the conductive springs employed in this embodiment;

FIG. 54 is an elevation view of one of the springs;

FIG. 55 is a top plan view of the combined top locking and unlocking plate in which the outline of the plate is shown in phantom lines and the conductive areas, which are on the bottom face, are shown in solid lines as they would appear looking down from the top, to facilitate an understanding of the circuit;

FIG. 56 is a top plan view of the key plate with a properly coded key therein;

FIG. 57 is a top plan view of the bottom combined locking and unlocking plate;

FIG. 58 is a diagrammatic sectional view according to FIG. 50 illustrating the circuit by barbed lines;

FIG. 59 is a similar sectional view according to FIG. 51;

FIG. 60 is a similar sectional view according to FIG. 52;

FIG. 61 is a fragmentary view, similar to FIG. 55, illustrating a modified arrangement of conductive areas on a combined top locking and unlocking plate;

FIG. 62 is a fragmentary view of the key plate showing a properly coded key for the combined locking and unlocking plates of FIGS. 61 and 63;

FIG. 63 is a fragmentary plan view of a bottom combined locking and unlocking plate with a modified arrangement of electrically conductive areas;

FIG. 64 is a view similar to FIG. 55, illustrating a further modified arrangement of the electrically conductive areas in a combined top locking and unlocking plate;

FIG. 65 is a top plan view of a key plate with a properly coded unlocking key for the modified form of FIGS. 64 and 66;

FIG. 66 is a top plan view of a combined bottom locking and unlocking plate illustrating a further modified arrangement of the electrically conductive areas;

FIG. 67 is a schematic sectional view according to FIG. 50, illustrating the electric circuit with the aid of barbed lines;

FIG. 68 is a similar view according to FIG. 51;

FIG. 69 is a similar view according to FIG. 52; showing, however, the unlocking wire in the upper contact plate.

FIGS. 70 to 75 illustrate a fourth embodiment of the invention, in which

Figures 70, 71, 72, 73:
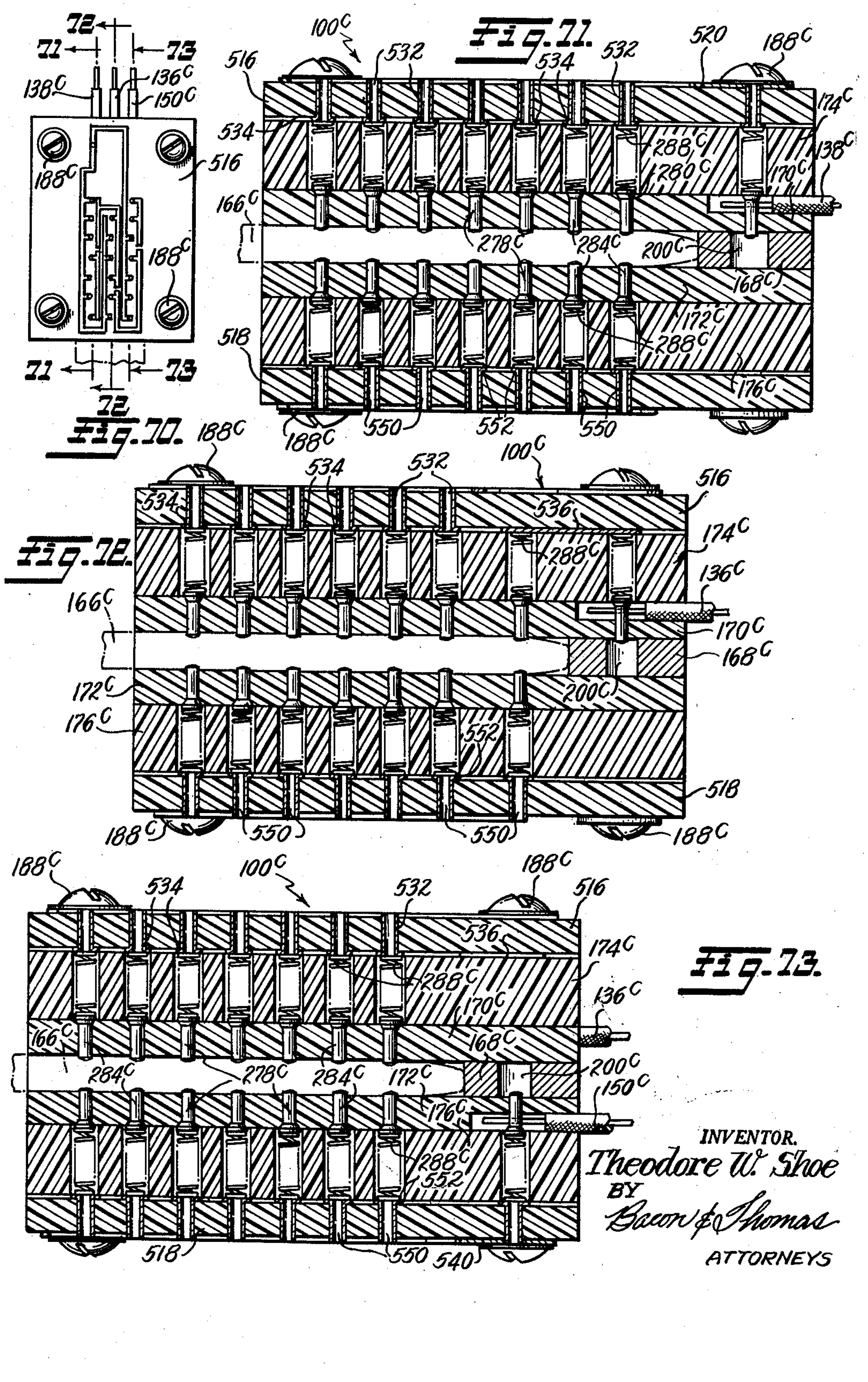
Figure 14:
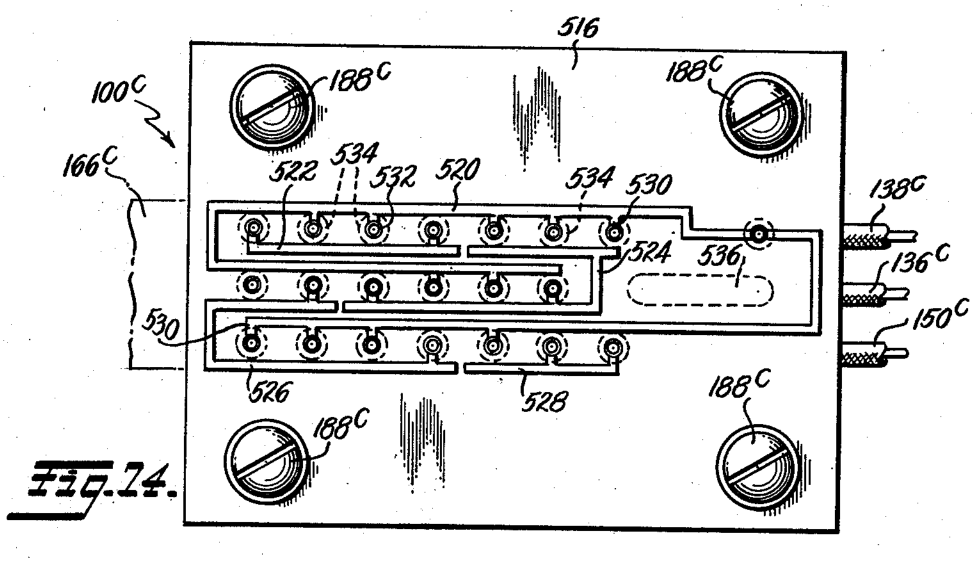
Figure 15:
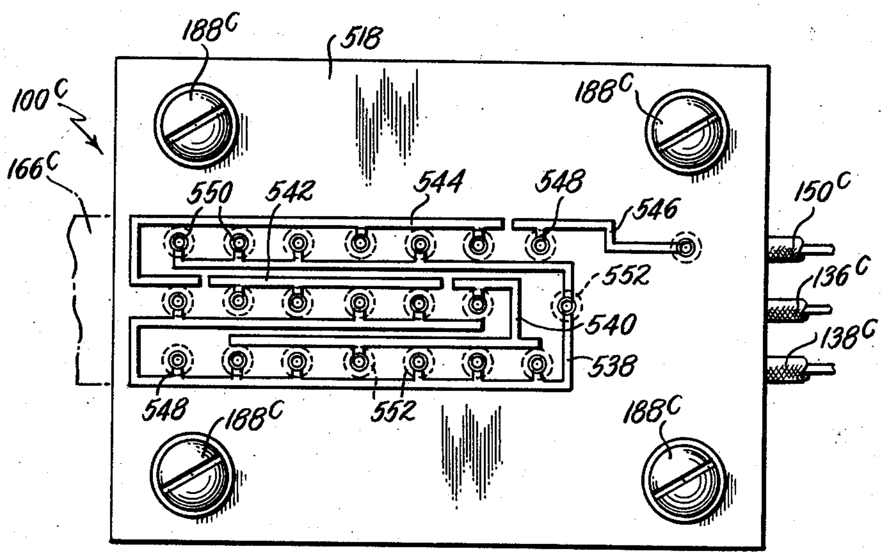

FIG. 70 shows a top plan view of the electric lock;

FIG. 71 is a longitudinal sectional view along the line of 71—71 of FIG. 70;

FIG. 72 is a longitudinal sectional view along the line 72—72 of FIG. 70;

FIG. 73 is a longitudinal sectional view along the line 73—73 of FIG. 70;

FIG. 74 is a top plan view of the top combined locking and unlocking plate; and

FIG. 75 is a bottom plan view of the bottom combined locking and unlocking plate.

Figure 12:
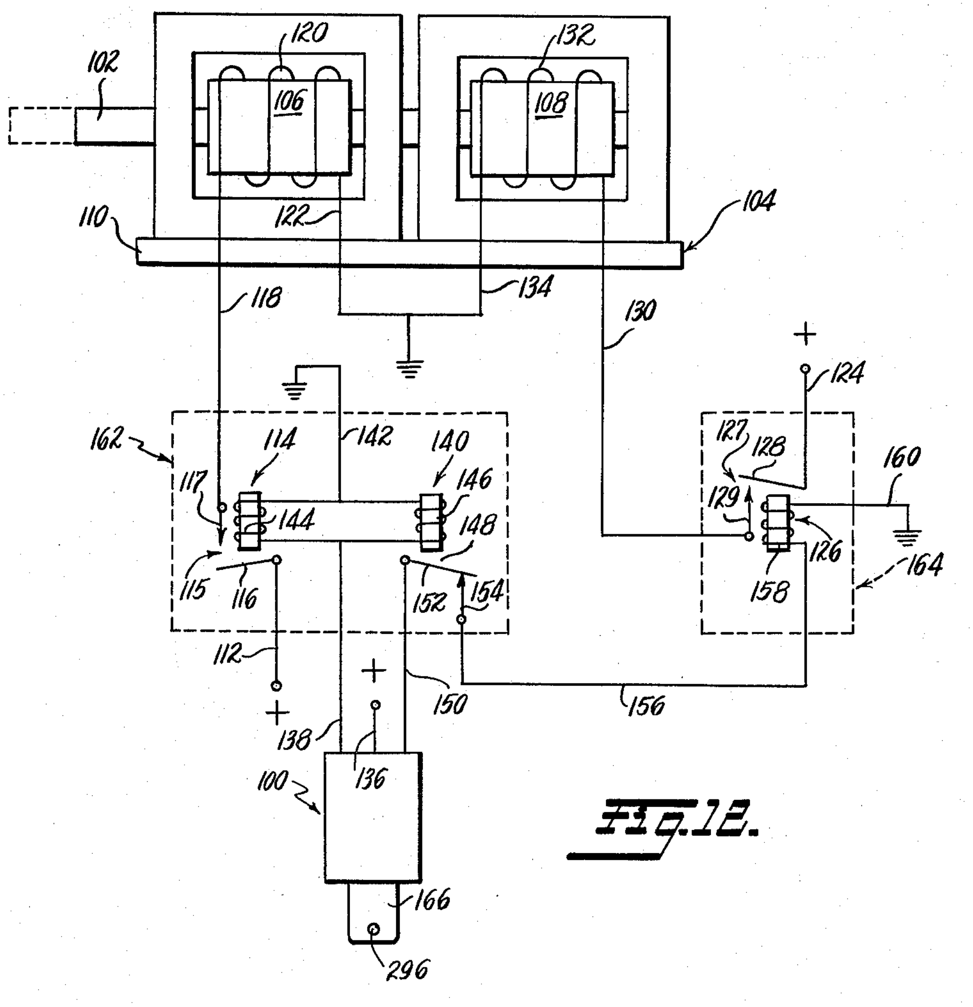
FIG. 12 is a diagrammatic representation of the electric lock in combination with an electrical circuit controlling movement of a locking member.

Referring to FIG. 12, an electric lock 100, the details of which will be described hereinafter, is connected in an electrical control circuit to operate a remotely positioned actuating member 102. In the specific arrangement chosen to describe the invention, the member 102 comprises a bolt of a locking device, and forms an armature of a double acting solenoid 104.

The double acting solenoid 104 comprises a pair of coils 106 and 108 mounted on a common base 110. The coil 106 may be considered a first actuator or a locking coil which, when energized, produces a movement of the armature 102 toward the left to the position shown in broken lines. The coil 108 may be considered a second actuator or an unlocking coil which, when energized, causes a movement of the armature 102 toward the right to the position shown in solid lines. For this purpose, the coils 106 and 108 are coaxial so that the armature 102 can pass through both coils.

A first electrical circuit is provided to energize the locking coil or first actuator 106, which comprises a conductor 112 leading from a source of electrical energy, a relay 114 including a normally open switch 115 having a movable contact 116 and a fixed contact 117, a conductor 118, winding 120 and conductor 122 to ground. Closing of the switch 115 of the relay 114 is effective to energize the locking coil to move the armature 102 to the left or to its locking position shown in broken lines.

A second electrical circuit is also provided to energize the unlocking coil or second actuator 108, which comprises a conductor 124 leading from a source of electrical energy, a relay 126 having a normally open switch 127 including a movable contact 128 and a fixed contact 129, a conductor 130, winding 132 of unlocking coil 108, and conductor 134 to ground. Closing of the switch 127 of relay 126 is effective to energize the unlocking coil 108 to move the armature 102 to its unlocked position shown in solid lines.

The electric lock 100 includes locking and unlocking plates to be described later, which plates are electrically connected in independent locking and unlocking circuits, respectively.

The locking circuit includes a conductor 136 leading from a source of electrical energy, the locking plates and connections within the lock 100 to be described hereinafter, conductor 138, parallel windings 144 and 146 of the relays 114 and 140, and conductor 142 to ground.

The unlocking circuit includes the conductor 136, the unlocking plates and connections within the lock 100 to be described hereinafter, conductor 150, a normally closed switch 148 of relay 140 having a movable contact 152 and a fixed contact 154, conductor 156, winding 158 of relay 126, and conductor 160 to ground.

The relays 114 and 140 are enclosed within a housing 162, and the relay 126 is enclosed within a housing 164, shown in broken lines.

The numeral 166 designates a key of electrically non-conductive material having inserts of conductive material adapted to cooperate with pairs of spaced contacts within the lock 100, as will be described in detail hereinafter. Insertion of an improper key, or a proper key in an inverted position, completes the locking circuit to energize relays 114 and 140. Relay 114 closes switch 115 to energize the locking coil 106, while relay 140 simultaneously opens switch 148 to assure that the unlocking circuit will not be accidentally or otherwise energized, even if an improper key may have included inserts to bridge the spaced contacts of the unlocking circuit within the lock 100. Only the insertion of a properly coded key 166 within the lock 100, in the proper position, will complete a circuit through the unlocking circuit to energize the relay 126 to close switch 127, which, in turn, energizes the unlocking coil 108.

Figure 11:
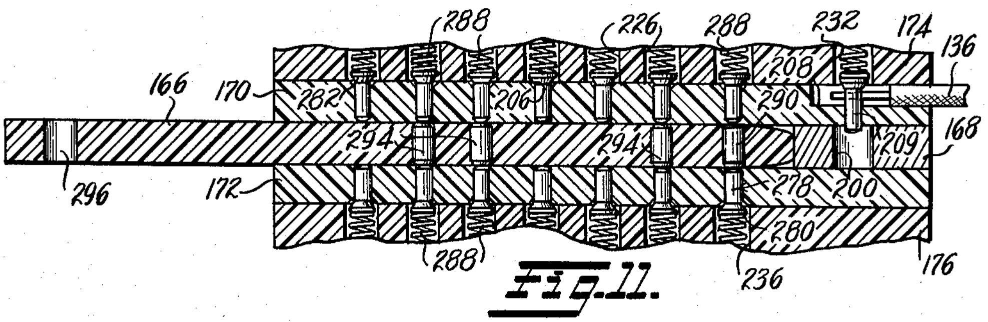
Figures 13, 14, 15, 16, 17, 18, 19, 20:
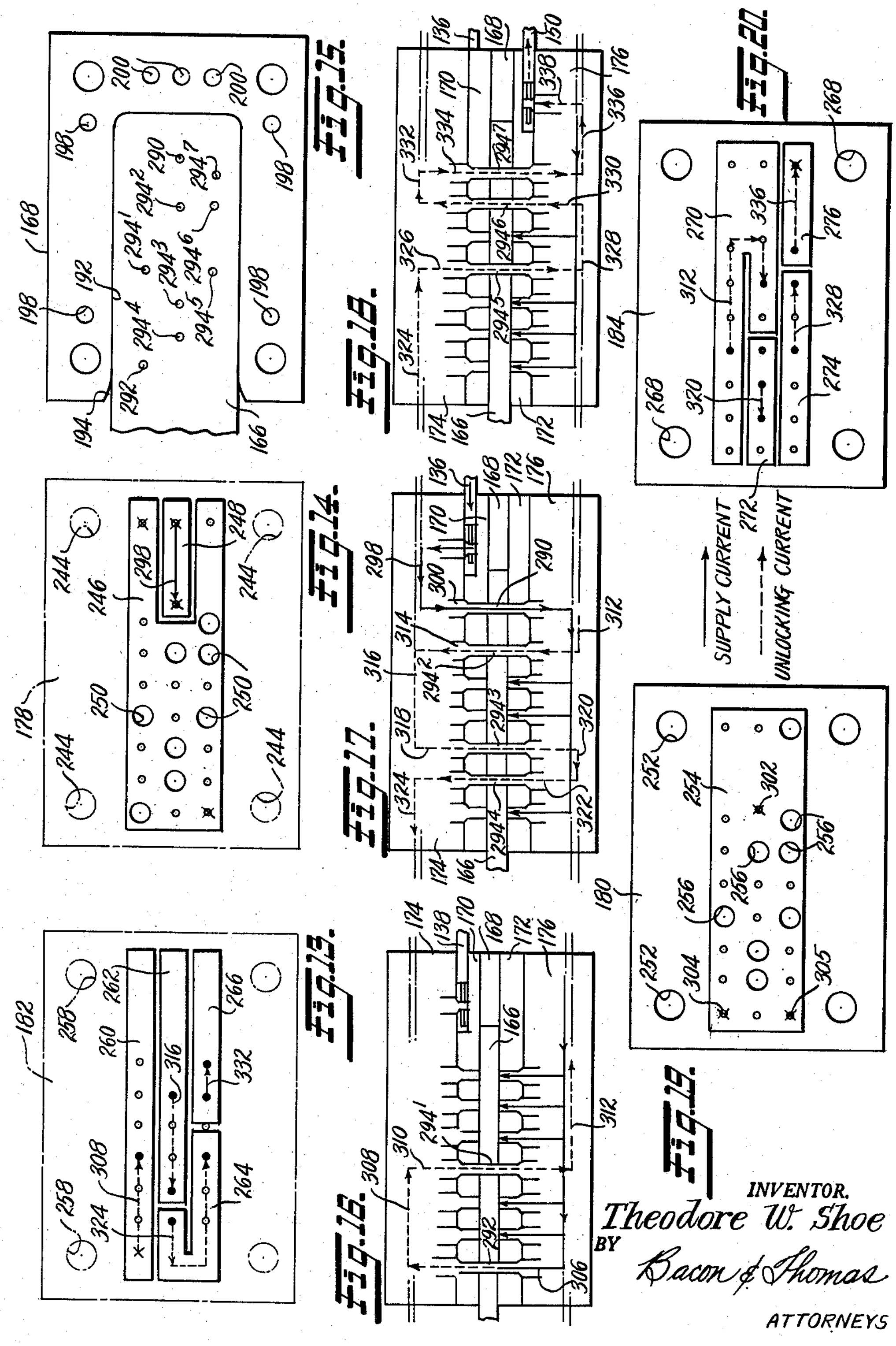

The key 166, as explained above, is made of electrically non-conductive material. It is generally rectangular in form and has a working fit in the slot 192, as shown in FIGS. 11 and 15, whereby there is substantially no play. A hole 296 is provided in one end to permit attachment to a key ring. The key includes a plurality of inserts of electrically conducting material passing transversely thereof, the ends laying flush with the upper and lower surfaces, where each insert contacts and forms a circuit between a contact above and a contact below the key, as seen in FIG. 11.

The inserts are arranged in three parallel rows aligned with the contacts in the contact plates. Each key includes an insert 290 at the inner end of the middle row, an insert 292 at the outer end of an end row, and a number of additional inserts 294 arranged at selected points in the three rows according to definite codes to complete an unlocking circuit through the lock.

Referring to the first embodiment illustrated in FIGS. 1 to 36, inclusive, the electric lock assembly in its entirety is designated by the numeral 100. This assembly is a laminated structure comprising a central key plate 168, a top contact plate 170, a bottom contact plate 172, a top spring plate 174, a bottom spring plate 176, a top locking plate 178, a bottom locking plate 180, a top unlocking plate 182, and a bottom unlocking plate 184. These plates are retained in assembled relation by a plurality of internally threaded key plate pins 186 passing through openings in each corner of the respective plates, and by screws 188. Washers 190 are placed between the screws 188 and the top and bottom unlocking plates 182 and 184.

Figure 8:
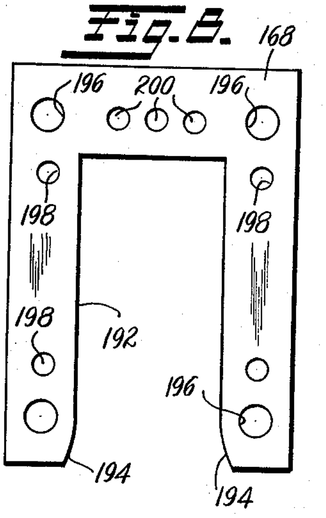

With reference to FIG. 8, the key plate 168 is made of metal and is of U-form, and has a slot 192 therein for the reception of a key, as will be explained hereinafter. The outer edges of the slot 192 are beveled at 194 to facilitate insertion of the key which is intended to have a snug fit in the slot. An opening 196 is provided at each corner for passage of the plate pins 186, as more clearly shown in FIG. 2. The openings 196 provide a press fit for the pins 186, thereby retaining the pins in the correct position. Additional openings 198 for the passage of locking screws, to be described later, and openings 200 for the contacts on a conductor from a source of current and on conductors to locking and unlocking members, are also provided.

Figure 9:
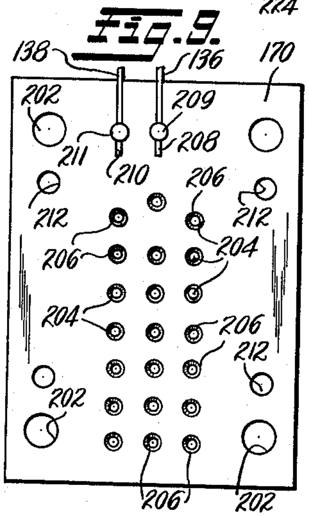
Figure 10:
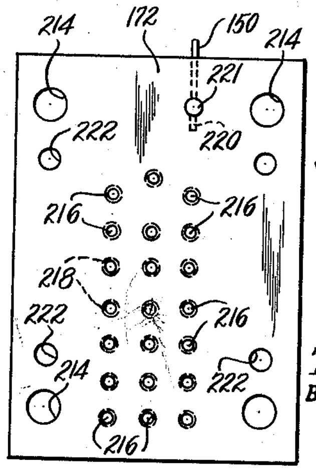

The top contact plate, shown in FIG. 9, is made of electrical non-conducting material. It is rectangular in form, having openings 202 in each corner for the passage of the plate pins 186, the openings being aligned with the openings 196 in the key plate. A plurality of openings 204 for the reception of contacts are arranged in three parallel rows, seven openings in each row, for a total of 21 openings. One end of each opening is countersunk at 206 for a purpose to be explained later. A first channel 208 is provided in the upper surface of the plate, (FIGS. 4 and 11), to receive a contact 209 and conductor 136 leading from a source of electric current. A second channel 210 (FIG. 3) is also provided in the upper surface of the plate to receive a contact 211 and conductor 138 for a locking circuit. Openings 212, aligned with the openings 198 in the key plate, for the passage of locking screws are also provided.

The bottom contact plate 172 (FIG. 10) is made of electrical non-conducting material, and has corner openings 214 for the passage of the key plate pins 186, and a plurality of openings 216 for the reception of contacts. These openings 216 are arranged in three parallel rows, are equal in number to and are aligned with the openings 204 in the top contact plate 170. The lower ends of each of the openings 216 are countersunk at 218. A channel 220, in the bottom surface of plate 172, receives a contact 221 and conductor 150 connected thereto. Additional openings 222, for the passage of the locking screws, are aligned with the openings 212 and 198 in the top contact plate and key plate, respectively.

The top spring plate is made of electrically non-conductive material (FIG. 6), and, like the other plates, is rectangular in form and has openings 224 in each corner for the passage of the plate pins, and a plurality of openings 226 for the reception of spring conductors to be described later. The spring openings 226 correspond in number to the openings 204 in the top contact plate, and are aligned with the openings 204 and 216 in the plates 170 and 172, respectively. Additional openings 228 for the locking screws are aligned with the corresponding openings in the plates 168, 170 and 172. The upper ends of the openings are countersunk at 230. In addition, there are two openings 232 adapted to receive spring conductors electrically connected with the contacts 209 and 211 and with the conductors 136 and 138, as will be described hereinafter.

The bottom spring plate 176 (FIG. 7), is made of electrical non-conducting material, and is similar to the top spring plate 174, except that only one additional opening 240 is provided for receiving a spring conductor having electrical contact with the contact 221 and the conductor 150. Openings 234 at each corner for the passage of the key plate pins 186, openings 238 for the passage of the locking screws, and openings 236 for the reception of spring conductors, are equal in number to and are aligned with similar openings in the plates 168, 170, 172 and 174.

Figures 1, 2, 3:
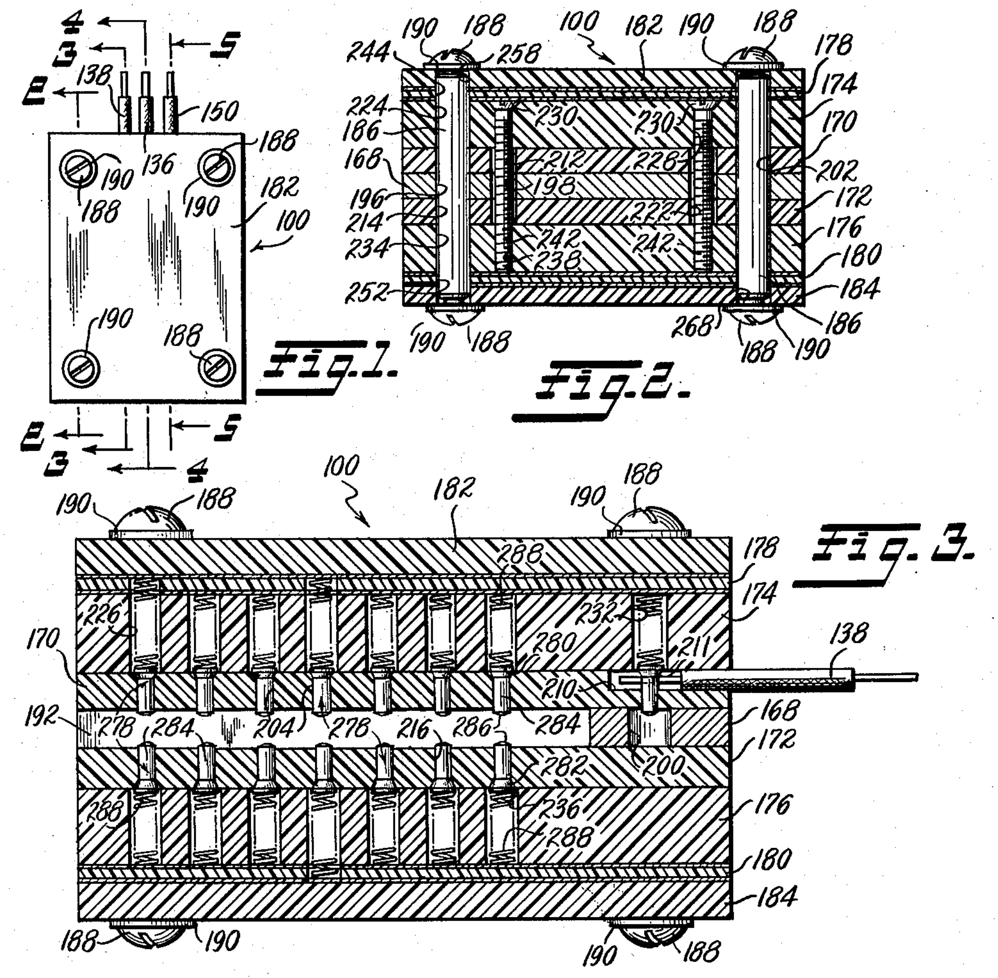

Referring to FIG. 2, a plurality of screws 242 retain the plates 174, 170, 168, 172, and 176 in assembled relation. The head of each screw is received within the countersunk ends 230 of the openings 228 in the top spring plate 174, and the threaded end of each screw matingly engages the internal threads in the openings 238 in plate 176. These five plates, so assembled, together with the four plate pins 186, form a basic structure to which various locking and unlocking plates may be selectively attached to provide for different locking and unlocking combinations, without disassembling the basic structure.

The top locking plate 178 (FIG. 14), is generally rectangular in form, is made of electrically non-conductive material, and has openings 244 at each corner for the passage of the key plate pins. First and second electrically conductive areas 246 and 248, respectively, are cemented to the bottom surface of the plate. These conductive areas are insulated from one another, and may take various forms, but, as illustrated, should be coextensive in area with that occupied by the openings 226 and 232 in the top spring plates. A number of openings 250 are provided through the conductive area 246 and the non-conducting plate 178, which openings are aligned with certain openings 226 in the top spring plate 174, for a purpose to be explained hereinafter. The openings through the conductive area 246 are slightly larger in diameter than the corresponding openings through the plate 178, to prevent any possible electrical contact between a conductive spring extending through the opening and the conductive area 246.

The bottom locking plate 180 (FIG. 19), is generally rectangular in form, and is made of electrically non-conducting material. Holes 252 at each corner permit the passage of the key plate pins 186. An electrically conductive area 254, coextensive in area with that occupied by the openings 236 and 240 in the bottom spring plate, is cemented or otherwise secured to the upper surface of the plate 180. A number of openings 256, passing through both the conductive area 254 and the plate 180 and aligned with certain openings 236 in the spring plate 176, are provided for a purpose to be explained hereinafter. The openings through the conductive area have a slightly greater diameter than the corresponding openings through the plate.

The top unlocking plate 182 (FIG. 13), has openings 258 in each corner for the passage of the key plate pins 186. The plate 182 is rectangular in form, is made of electrically nonconductive material, and has cemented or otherwise secured to one surface thereof a plurality of electrically conductive areas 260, 262, 264 and 266. These electrically conductive areas are electrically insulated from one another, and are arranged in an area coextensive with the area occupied by the openings 226 and 232 in the upper spring plate 174. The conductive areas comprise longitudinal strips, and/or U-shaped members having longitudinally extending legs, the legs and strips being arranged in three parallel rows aligned with the openings 226 and 232 in the top spring plate 174, and in electrically conductive relation with selected springs 288 therein.

The bottom unlocking plate 184 (FIG. 20), is also rectangular in form, having openings 268 at each corner for the passage of the key plate pins 186. This plate is made of electrically non-conductive material, and has a plurality of electrically conductive areas 270, 272, 274 and 276 cemented or otherwise secured to the upper surface thereof. These conductive areas are insulated from one another, and their total area is coextensive with the area of the openings 236 and 240 in the bottom spring plate 176. The conductive areas, like those in the top unlocking plate 182, comprise longitudinal strips and/or U-shaped members having longitudinally extending legs, the legs and strips being arranged in three parallel rows aligned with the openings 236 and 240 in the bottom spring plate 176 and in electrically conductive relation with selected springs 288 therein.

As shown in FIGS. 3, 4, 5 and 11, a contact 278 is slidably mounted in each of the openings 204 and 216 in the top and bottom contact plates 170 and 172, respectively. Each of these contacts comprises an end cylindrical portion 280 which contacts the springs 288, a frusto-conical portion 282, and a cylindrical portion 284 having a spherical end portion 286. The frusto-conical portions 282 engage the countersunk ends 206 and 218 of the openings 204 and 216, respectively. To limit the movement of the contacts into the slot 192, the contacts have a length which is slightly greater than the length of the openings 204 and 216, so that the spherical end portions 286 of the contacts project into the key slot 192 as more clearly shown in FIGS. 3, 4 and 5.

Figure 4:
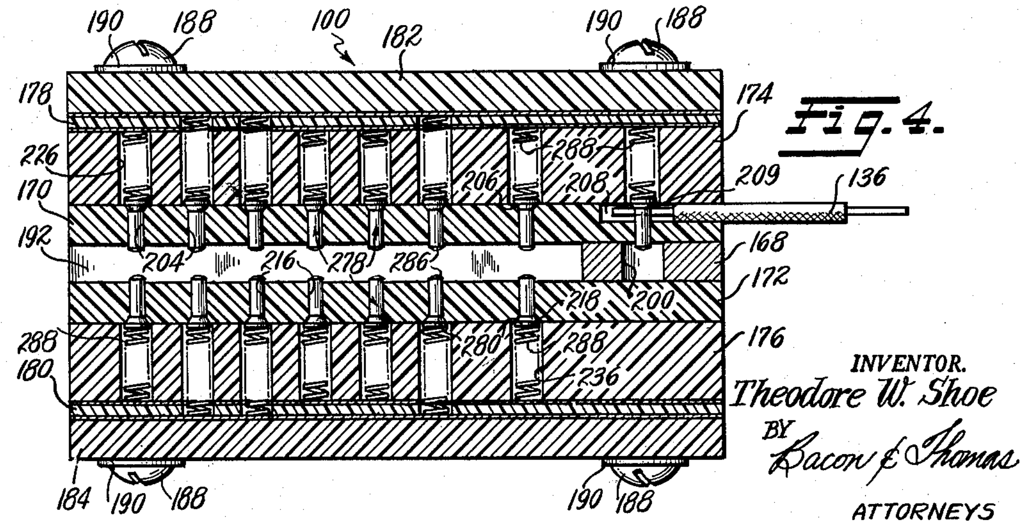
Figure 5:
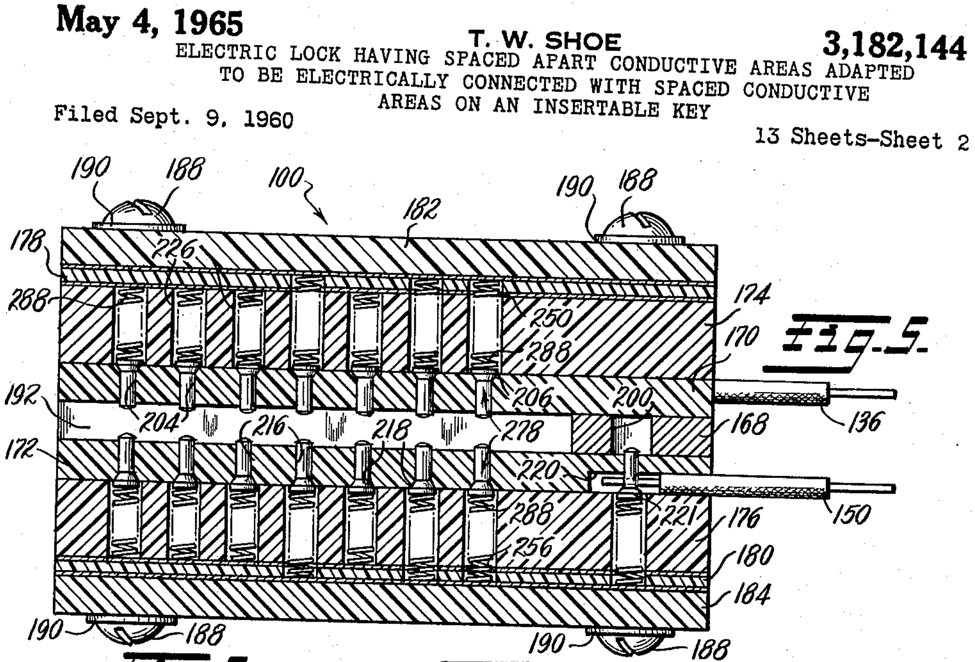
Figure 6:
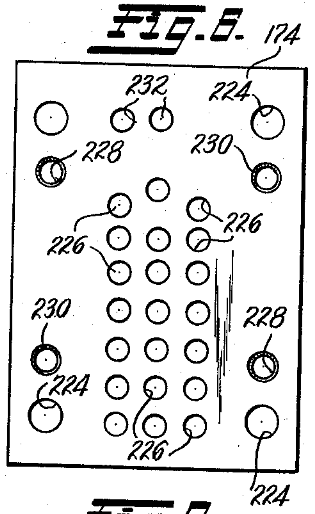
Figure 7:
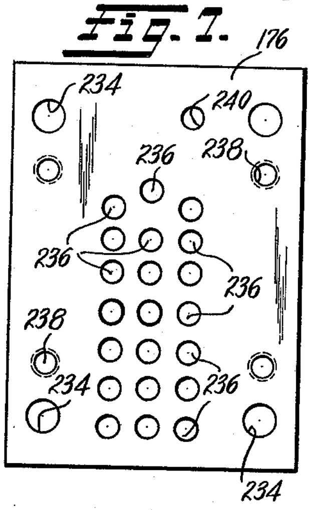

An electrical conductive helical spring 288 is mounted within each of the openings 226 and 232 in the top spring plate 174, and within the openings 236 and 240 in the bottom spring plate 176. As can be seen in FIGS. 3, 4 and 5, the inner end of each of these springs is in electrically conductive relation with the cylindrical end portion 280 of one of the contacts 278, while the other end thereof engages an electrically conductive area in one of the locking or unlocking plates. For example, with reference to FIG. 5, the outer ends of the first, second, third and fifth springs 288 in the spring plate 174 (from left to right) are in electrically conductive relation with the electrically conductive area 246 of the top locking plate 178, while the fourth, sixth and seventh springs 288 pass through the openings 250 in the electrically conductive area 246 and the top locking plate, to make electrical contact with the conductive areas 264 and 266 in the top unlocking plate 182 (FIG. 13). The openings 250 in the conductive area 246 in the top locking plate 178, and the openings 256 in the bottom locking plate 180 and the conductive area 254 thereon, are sufficiently large to permit the passage of the electrically conductive springs 288 without contact with the conductive areas 246 and 254, respectively. In the bottom spring plate 176 (FIG. 5), the same relationship of contacts with the bottom locking and unlocking plates prevails. A spring 288 passes through an opening in the bottom locking plate 180 to establish a flow of current between the contact 221 and the electrically conductive area 276 (FIG. 20), in the bottom unlocking plate 184.

With reference to FIGS. 3, 13 and 14, the first and fourth springs 288 in the top spring plate 174 engage the conductive area 260 in the top unlocking plate 182, and the second, third, fifth, sixth, seventh and eighth springs are in electrically conductive relation with the area 246 in the top locking plate 178 (as indicated by the small circles which have been added to facilitate the description of the circuit). The eighth spring is connected to contact 211 and conductor 138. Referring to FIGS. 3, 19 and 20, the first, second, third, fifth, sixth and seventh springs 288 in the bottom spring plate 176 are in electrically conductive relation with the conductive area 254 on the bottom locking plate 180, while the fourth spring 288 passes through an opening 256 in the bottom locking plate 180 and conductive area 254 to make electrical contact with the conductive area 270 on the bottom unlocking plate 184 (as indicated by the shaded circle in FIG. 20).

With reference to FIGS. 4, 13 and 14, the first, fourth and fifth springs 288 in the top spring plate 174 are in electrically conductive relation with the conductive area 246 of the top locking plate 178 and the seventh spring 288, and the sixth spring 288 is in electrically conductive relation with the left hand end of the conductive area 248 (FIG. 14). An additional spring 288 (extreme right) establishes an electrically conductive relation between the right hand end of the conductive area 248 and the contact 209 and the conductor 136. Referring to FIGS. 4, 19 and 20, the first, fourth, fifth and seventh springs 288 in the bottom spring plate 176 are in electrically conductive relation with the conductive area 254 on the bottom locking plate 180, while the second and third springs 288 pass through the openings 256 and establish an electrical path to the conductive area 272 on the bottom unlocking plate 184, and the sixth spring 288 passes through an opening 256 in the bottom locking plate 180 to establish an electrical contact with the electrically conductive area 270 on the bottom unlocking plate 184.

The above described circuits which the springs 288 provide with the locking and unlocking plates can be easily changed by substituting various forms of top and bottom locking and unlocking plates. Examples thereof are shown in FIGS. 21, 22, 27, 28, 29, 30, 35 and 36.

FIGS. 13 to 20, inclusive, trace the unlocking circuit when using a properly coded key 166 correctly inserted within the slot 192. In FIGS. 13 and 14, which illustrate the top unlocking plate and the top locking plate, respectively, the outline is shown in phantom lines, in order to more clearly show, in solid lines, the relative arrangement of the electrically conductive areas as they would be seen from the top, to simplify an understanding of the circuit. With the key 166 within the slot 192, as shown in FIG. 15, the current may be traced as follows: conductor 136 (FIG. 17), arrows 298, through the conductive area 248 in the top locking plate 178 (FIGS. 17 and 14), arrow 300 through the insert 290 of key 166 (FIGS. 17 and 15), contacting the conductive area 254 of the bottom locking plate 180 at point designated 302 (FIG. 19); from point 304 in said bottom locking plate 180 (FIG. 19), by arrow 306 and insert 292 (FIGS. 16 and 15), 308 in conductive area 260 (FIGS. 16 and 13), 310 including insert 294' (FIGS. 16 and 15), 312 in conductive area 270 (FIGS. 16, 17 and 20), 314 including the insert $294^2$ (FIGS. 17 and 15), 316 in conductive area 262 (FIGS. 17 and 13), 318 including insert $294^3$ (FIGS. 17 and 13), 320 in conductive area 272 (FIGS. 17 and 20), 322 including insert $294^4$ (FIGS. 17 and 15), 324 in conductive area 264 (FIGS. 17, 18 and 13), 326 including insert $294^5$ (FIGS. 18 and 15), 328 in conductive area 274 (FIGS. 18 and 20), 330 including insert $294^6$ (FIGS. 18 and 15), 332 in conductive area 266 (FIGS. 18 and 13), 334 including insert $294^7$ (FIGS. 18 and 15), 336 in conductive area 276 (FIGS. 18 and 20) and 338 to unlocking conductor 150 (FIG. 18).

Figures 21, 22, 23, 24, 25, 26, 27, 28:
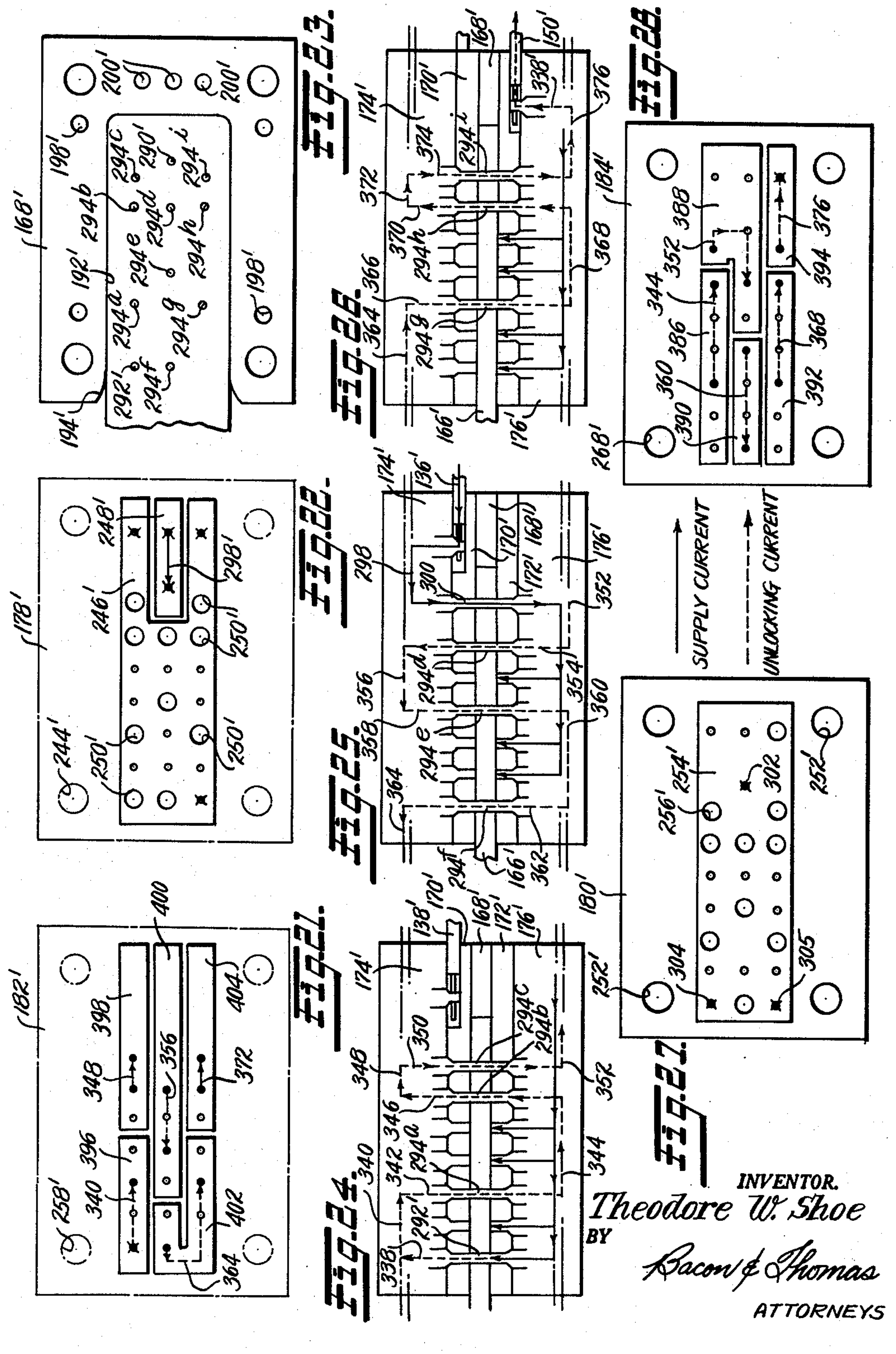

FIGS. 21 to 28, inclusive, disclose a modified locking arrangement, in which similar parts which correspond to those in the modification in FIGS. 1 to 11 bear the same reference numerals with the superscript "prime." This form of the invention utilizes the same key plate, upper and lower contact plates, and upper and lower spring plates. There are, however, different top and bottom locking plates 178' and 180', and different top and bottom unlocking plates 182' and 184' substituted in the assembly. As explained above, this modification is accomplished by removing the screws 188', which permits the easy removal of the top and bottom locking and unlocking plates, while the locking screws 242 retain the other plates in assembled relation. When the substituted top and bottom locking and unlocking plates have been placed in position, the screws 188' may be threaded into the pins 186' to hold the reconstituted lock in assembled relation. The springs 288' need not be changed in this new arrangement, as they will cooperate with the openings in the contact areas to provide the required circuit. The unlocking circuit can be traced as follows: supply current entering at 136 (FIG. 25), arrow 298 in conductive area 248' (FIGS. 25 and 22), 300 including insert 290' (FIGS. 25 and 23), contacting point 302 on conductive area 254' (FIG. 27). The current leaves at point 304 and, via 338 including insert 292' (FIGS. 24 and 23), 340 in conductive area 396 (FIGS. 24 and 21), 342 including insert $294^a$ (FIGS. 24 and 23), 344 in conductive area 386 (FIGS. 24 and 28), 346 including insert $294^b$ (FIGS. 24 and 23), 348 in conductive area 398 (FIGS. 24 and 21), 350 including insert $294^c$ (FIGS. 24 and 23), 352 in conductive area 388 (FIGS. 24, 25 and 28), 354 including insert $294^d$ (FIGS. 25 and 23), 356 in conductive area 400 (FIGS. 25 and 21), 358 including insert $294^e$ (FIGS. 25 and 23), 360 in conductive area 390 (FIGS. 25 and 28), 362 including insert $294^f$ (FIGS. 25 and 23), 364 in conductive area 402 (FIGS. 25, 26 and 21), 366 including insert $294^g$ (FIGS. 26 and 23), 368 in conductive area 392 (FIGS. 26 and 28), 370 including insert $294^h$ (FIGS. 26 and 23), 372 in conductive area 404 (FIGS. 26 and 21), 374 including insert $294^i$ (FIGS. 26 and 23), 376 in conductive area 394 (FIGS. 26 and 28), and 338' to unlocking conductor 150 (FIG. 26).

FIGS. 29 to 36, inclusive, show the same lock assembly according to FIGS. 1 to 11, inclusive, and illustrate the circuit when the key 166 of FIG. 15 is inserted in an inverted position (as seen in FIG. 31). The circuit can be traced as follows: inlet at 136 following arrow 298 in conductive area 248 (FIGS. 33 and 30), 300 including insert 290 (FIGS. 33 and 31), to point 302 in conductive area 254 (FIG. 35), then from point 305 and 380 including insert 292 (FIGS. 34 and 31), and 382 (FIGS. 34 and 30), and 384 (FIG. 32) to conductor 138 to the locking circuit. There is also a circuit through 387 and 389, including inserts $294^j$ and $294^k$ (FIGS. 32 and 31), 391 (FIGS. 32 and 30) and 384 to conductor 138. A similar locking circuit, utilizing a different path, would be created by any key in which the inserts are improperly arranged or by the inverted insertion of the proper key. From the foregoing, it is evident that the use of the wrong coded key or the inversion of the properly coded key, is ineffective to cause an unlocking circuit.

In the above circuits, as well as in the circuits in the embodiments to be described hereinafter, the incoming current from conductor 136 travels through contact 209, spring 288, conductive area 248 (or corresponding area) on the top locking plate, through springs 288 and insert 290 in the key to the point 302 or corresponding point on the bottom locking plate. All keys have inserts 290 and 292 located at the same positions. Insert 290 is located in the middle adjacent the end of the key, and the key must be fully inserted into the slot until the key engages the contacts before there is any flow of current in the lock. Thus, any key, whether inserted in proper or inverted position, will cause a current flow to the bottom locking plate. Likewise, any key, inserted in an inverted position, will cause a flow of current from the bottom locking plate to the top locking plate through insert 292. The invention does not contemplate the provision of a hole at point 304 or 305, or corresponding points in other bottom locking plate, in any of the embodiments of the invention.

In all embodiments of the invention, the insertion of any key, whether properly coded or not, in a proper position, results in a flow of current from the point 304 (or corresponding point), through insert 292 to a first conductive area in the top unlocking plate.

In the description of the unlocking circuit in the first embodiment, which is also true as to the other embodiments to be described, each unlocking plate includes a plurality of electrically conductive areas which are insulated from one another, which areas are interconnected in series by the inserts 294 in the key.

FIGS. 37 to 48, inclusive, illustrate a second embodiment of the invention, in which corresponding elements are identified by the same reference numeral with the addition of the superscript "*a*." In this form of the invention, the key plate $168^a$, the contact plates $170^a$ and $172^a$, and the unlocking plates $182^a$ and $184^a$, are identical with the modification shown in FIGS. 1 to 11 and 13 to 36. The embodiment shown in FIGS. 37 to 48, inclusive, utilizes two different forms of conductive springs. One form is the same as the spring disclosed in the first modification, designated herein as $288^a$, and the second form of spring, shown in FIGS. 47 and 48, and designated 406, comprises a helix of constant diameter, in which the end turns are enlarged at 408 in the general shape of a triangle for a purpose to be explained hereinafter.

One end of the openings $226^a$ and $236^a$ in the spring plates $174^a$ and $176^a$, respectively, is counterbored at 410.

Instead of providing openings at only selected points in the contact area 246, as in the first described embodiment, the present embodiment provides openings 412 (FIG. 44), in nineteen of the contact points in the conductive area $246^a$. No opening is provided at the point 416, which point cooperates with the insert 292 of all keys to produce a locking circuit if the key is inserted in an inverted position, as explained above. The openings 412 pass through the plate $178^a$, and, about each opening, a counterbore 414 is provided to remove the metal of the conductive area about each opening, to assure there will be no contact with the spring conductors $288^a$ which pass through said openings. Referring to FIG. 45, all of the circuits points in the conductive area $254^a$ except those designated at 417, 419 and 421 (corresponding to points 302, 304 and 305, respectively, in the first embodiment), are bored at 418, and the conductive area around each bore 418 is counterbored at 420, as more clearly shown in FIG. 46. The points 417, 419 and 421 form part of the circuit for each lock and are not intended to be changed for various locking combinations.

From the foregoing, various combinations can be made by utilizing either springs $288^a$, which pass through the openings 412 or 418 to make contact with the conductive areas in the top and bottom unlocking plates, or by using springs 406 in which the triangular ends 408 are larger than the diameter of the counterbores 414 and 420 in order to make contact with the conductive areas on the top and bottom locking plates. In this embodiment, it is not necessary to replace the top and bottom locking plates $178^a$ and $180^a$ to change the combination, but the combination can be changed by substituting different top and bottom unlocking plates and by employing appropriate springs $288^a$ and 406 in the proper openings $226^a$ and $236^a$ in the spring plates $174^a$ and $176^a$. The counterbores 410, which have a diameter larger than that encompassed by the triangular end turn 408 of the spring 406, provide recesses to receive the end turns.

A third embodiment of the invention is illustrated in FIGS. 49–63, inclusive, in which elements corresponding to those of the embodiment shown in FIGS. 1 to 11 and 13 to 36 are designated by the same reference numeral with the addition of the superscript "b."

Basically, the structure comprises a central key plate $168^b$, top and bottom contact plates $170^b$ and $172^b$, and top and bottom spring plates $174^b$ and $176^b$, which are retained in assembled relation by means of screws, not shown, corresponding to the screws 242 in FIGS. 1 to 11.

Instead of separate locking and unlocking plates, as disclosed in the first two embodiments, the embodiment disclosed in FIGS. 49 to 63 includes a single top combined locking and unlocking plate 422 and a single bottom combined locking and unlocking plate 424, provided with corner openings 426 and 427, respectively, through which the key plate pins $186^b$ extend, to receive the retaining screws $188^b$. The top combined locking and unlocking plate 422 is made of an electrical non-conducting material, and carries, on the lower face thereof, an electrically conductive area 428 (which corresponds, in function, to the electrically conductive area 248 in the first embodiment), a locking conductive area 430 and unlocking electrically conductive areas 432, 434, 436 and 438. The several locking and unlocking areas are insulated from one another. The bottom combined locking and unlocking plate 424 is made of electrically non-conducting material, and includes a locking electrically conductive area 440 and four unlocking electrically conductive areas 442, 444, 446 and 448. The several locking and unlocking electrically conductive areas are insulated from one another. Each of the locking and unlocking electrically conductive areas in the top and bottom plates 422 and 424 is connected, by means of lateral branches, to one or more contacts 450. The contacts 450 are arranged in three parallel rows, and correspond in number and in position with the openings $226^b$ and $236^b$ in the spring plates $174^b$ and $176^b$. The conductive areas and the contacts on the bottom combined locking and unlocking plate 424 are disposed on the upper surface thereof, and, as explained above, the conductive areas and the contacts on the top combined locking and unlocking plate are disposed on the lower surface thereof, whereby they are in electrically conductive relation with the springs 452 in the openings $226^b$ and $236^b$ in the upper and lower spring plates $174^b$ and $176^b$, respectively. The spring 452 is shown in FIGS. 53 and 54, and comprises a helix having a uniform diameter which decreases at one end, as shown at 453. The smaller diameter end 453 engages the contacts 450.

With reference to FIGS. 55 to 60, inclusive, the insertion of a properly coded key $166^b$ into the slot $192^b$ of the key plate $168^b$ will result in the following circuit: inlet at $136^b$ and, by way of 454 (FIG. 59), 456 (FIG. 59 and through conductive area 428 in FIG. 55), 458 and insert 290 (FIGS. 59 and 56), point 460 on conductive area 440 (FIG. 57), point 461, arrow 462 and insert 292 (FIGS. 57 and 58), 464 (FIG. 58 including conductive area 432 in FIG. 55), 466 and insert $294^n$ (FIGS. 58 and 56), 468 (FIGS. 58 and 59 including conductive area 442 in FIG. 57), 470 and insert $294^o$ (FIGS. 59 and 56), 472 (FIG. 59 including area 434 in FIG. 55), 474 including insert $294^p$ (FIGS. 59 and 56), 476 (FIG. 59 including conductive area 444 in FIG. 57), 478 and insert $294^r$ (FIGS. 59 and 56), 480 (FIGS. 59 and 60 including area 436 in FIG. 55), 482 and insert $294^s$ (FIGS. 60 and 56), 484 (FIG. 60 including area 446 in FIG. 57), 486 and insert $294^t$ (FIGS. 60 and 56), 488 (FIG.60), including conductive area 438 in FIG. 55), 490 and insert $294^u$ (FIGS. 60 and 56), 492 (FIG. 60 including the electrically conductive area 448 in FIG. 57), and 494 (FIG. 60) to unlocking conductor 150. It should be noted that FIG. 55, while purporting to show an upper plan view of the top combined locking and unlocking plate, discloses the electrically non-conducting plate 422 in phantom lines and the conducting area in solid lines, as would be seen looking through the top of the plate, to facilitate a tracing of the circuit.

FIGS. 61 and 63 illustrate a modified construction of the top combined locking and unlocking plate $422^a$ and the bottom combined locking and unlocking plate $424^a$, while FIG. 62 illustrates a coded key $166^{b'}$ for unlocking this modified construction. The top combined locking and unlocking plate $422^a$ includes an electrically conductive area $428^a$, a locking conductive area $430^a$ and five unlocking electrically conductive areas 496, 498, 500, 502 and 504. The bottom plate $424^a$ carries a locking electrically conductive area $440^a$ and five unlocking electrically conductive areas 506, 508, 510, 512, and 514. Each of these electrically conductive areas is connected by branches to contacts $450^a$ arranged in three parallel rows. In view of the description of the circuit in connection with FIGS. 55 to 60, inclusive, it is believed that the circuit for the plates shown in FIGS. 61, 62 and 63 is obvious.

Another modified arrangement of the combined top locking and unlocking plate and the combined bottom locking and unlocking plate is illustrated in FIGS. 64 to 69, in which the plates $170^b$, $172^b$, $174^b$, and $176^b$ are slightly modified to accommodate the conductor $150^b$ in the top contact plate $170^b$ instead of in the bottom contact plate $172^b$ as in the previously described embodiments. With a properly coded key $166^{b2}$, properly inserted into the slot $192^{b2}$, the unlocking circuit can be traced as follows:

Conductor $136^{b2}$ and arrow 590 (FIG. 68), 592 (FIG. 68 and area $428^b$ in FIG. 64), 594 and insert 290 (FIGS. 68 and 65), contact 596, conductive area 576 and contact 597 (FIG. 66), 598 and insert 292 (FIGS. 67 and 65), 600 including conductive area 562 (FIGS. 67 and 64), 602 and insert $294^{11}$ (FIGS. 67 and 65), 604 including conductive area 578 (FIGS. 67 and 66), 606 and insert $294^{12}$ (FIGS. 67 and 65), 608 including conductive area 564 (FIGS. 67 and 64), 610 and insert $294^{14}$ (FIGS. 67 and 65), 612 including conductive area 580 (FIGS. 67 and 66), 614 and insert $294^{16}$ (FIGS. 67 and 65), 616 including conductive area 566 (FIGS. 67, 68 and 64), 618 and insert $294^{18}$ (FIGS. 68 and 65), 620 including conductive area 582 (FIGS. 68 and 66), 622 and insert $294^{20}$ (FIGS. 68 and 65), 624 including conductive area 568 (FIGS. 68 and 64), 626 and insert $294^{22}$ (FIGS. 68 and 65), 628 including conductive area 584 (FIGS. 68 and 66), 630 and insert $294^{24}$ (FIGS. 68 and 65), 632 including conductive area 570 (FIGS. 68, 69 and 64), 634 and insert $294^{26}$ (FIGS. 69 and 65), 636 including conductive area 586 (FIGS. 69 and 66), 638 and insert $294^{28}$ (FIGS. 69 and 65), 640 including conductive area 572 (FIGS. 69 and 64), and 642 to unlocking circuit $150^{b2}$ (FIG. 69).

It is believed that an understanding of the locking circuit is obvious in view of the previously described embodiments.

A fourth embodiment of the invention is illustrated in FIGS. 70 to 75, inclusive, in which the electric lock is designated by the reference number $100^c$, and elements which correspond to those in the first embodiment shown in FIGS. 1 to 11 are designated by the same reference numeral with the addition of the superscript "c." The central key plate $168^c$, top and bottom contact plates $170^c$ and $172^c$, top and bottom spring plates $174^c$ and $176^c$, and the springs $288^c$ as well as the contacts $278^c$, are identical to those in the embodiment shown in FIGS. 1 to 11. The plates are retained in position by a plurality of screws, not shown, corresponding to the screws 242 in the first embodiment.

The last embodiment differs from the first embodiment in that a single top plate and a single bottom plate, each carrying electrically conductive locking and unlocking elements are provided, instead of separate top and bottom locking and unlocking plates. In the embodiment shown in FIGS. 70 to 75, the locking and unlocking conductive areas are on the outer surfaces of the combined locking and unlocking plates, instead of on the inner surface in accordance with the third embodiment shown in FIGS. 49 to 63. The top combined locking and unlocking plate 516 is made of electrically non-conductive material and carries on its upper surface a plurality of electrically conductive areas. Similarly, the bottom combined locking and unlocking plate 518 is made of electrically non-conductive material and carries on its bottom or outer surface a plurality of electrically conductive locking and unlocking areas.

Referring to FIG. 74, the top combined locking and unlocking plate 516 includes a locking conductive area 520, and four unlocking conductive areas 522, 524, 526 and 528. The several conductive areas are electrically insulated from each other, and each is provided with two or more lateral branches 530 leading to a conductive sleeve 532, which passes through a bore in the plate 516. The lower end of each sleeve carries a contact ring 534 abutting the lower surface of the plate 516. The conductive sleeves 532 and the rings 534 thereon are arranged in three parallel rows, and are equal in number, except for the two springs $288^c$ which contact the conductive area 536 on the bottom face of plate 516, and aligned with the springs $288^c$ in the top spring plate $174^c$. An electrically conductive area 536 is provided on the bottom surface of the plate 516, which corresponds, in function, to the conductive area 248 in the first embodiment.

Referring to FIG. 75, the bottom combined locking and unlocking plate 518 is made of electrically non-conductive material, and carries, on the bottom or outer surface, a locking electrically conductive area 538, and four unlocking electrically conductive areas 540, 542, 544, and 546. Each of these areas is provided with lateral branches 548 leading to conductive sleeves 550 which pass transversely through the plate 518. A contact ring 552, flush with the inner surface of the plate 518, is connected with each sleeve 550. The conductive sleeves 550 are arranged in three parallel rows, corresponding to the number and to the position of the springs 288$^c$ in the bottom spring plate 176$^c$. It is believed that the operation of this embodiment is evident from an understanding of the previously described embodiments, and a detailed description of the circuit is omitted.

It will be understood that various changes may be made in the details of construction and in the arrangement of the parts in the locks and locking system disclosed herein without departing from the principles of the invention and the scope of the annexed claims.

I claim:

1. In an electric lock: a key plate having a slot extending through an edge therefor for the receipt of a key; non-conductive circuit plate means on each side of said key plate and secured thereto; each circuit plate means having a plurality of spaced conductive areas thereon; electrical conductors connected to each of said conductive areas and having contact portions projecting into said slot; the contact portion of each conductor connected to one of said circuit plate means being in aligned and opposed but in spaced relation to a contact portion of a conductor connected to the other circuit plate means; and a key of non-conductive material removably positioned in said slot, said key having a plurality of conductive inserts extending transversely therethrough and so positioned thereon that said inserts each engage predetermined opposed contact portions and electrically connecting the same, said predetermined opposed contact portions including portions connected to each of said conductive areas so that said inserts electrically connect all said conductive areas in series.

2. An electric lock as defined in claim 1 including further plates between said circuit plate means and said key plate, said conductors extending through said further plates.

3. An electric lock as defined in claim 1 wherein said conductive areas are on those faces of said circuit plate means nearest said key plate.

4. An electric lock as defined in claim 1 wherein said conductive areas are on those surfaces of said circuit plate means remote from said key plate, said conductors passing through said circuit plate means.

5. In an electric lock: a key plate having a slot extending through an edge thereof for the reception of a key; a first pair of non-conductive circuit plates on each side of said key plate and secured thereto; one circuit plate of each pair having a plurality of spaced conductive areas thereon forming part of an unlocking circuit; the other circuit plate of each pair having conductive areas thereon forming part of a locking circuit; electrical conductors connected to each of said conductive areas and having contact portions projecting into said slot; the contact portion of each conductor connected to said one of said circuit plate of each pair being in aligned and opposed but in spaced relation to a contact portion of a conductor connected to said one plate of the other pair; and a key of non-conductive material removably positioned in said slot, said key having a plurality of conductive inserts extending transversely therethrough and so positioned thereon that said inserts each engage predetermined opposed contact portions and electrically connecting the same, said predetermined opposed contact portions including portions connected to each of said conductive areas of said one plate of each pair so that said inserts electrically connect all said conductive areas of said one plate of each pair in series.

6. In an electric lock: a key plate having a slot extending through an edge thereof for the reception of a key; a pair of contact plates, one on each side of said key plate, said contact plates each having conductive contacts slidably mounted thereon and projecting into said key slot, each contact in one contact plate being opposed to but spaced from a contact in the other contact plate; a spring plate adjacent each contact plate and having openings therethrough aligned with said contact; a conductive spring in each opening and engaging its aligned contact; non-conductive circuit plate means adjacent each spring plate; each circuit plate means having a plurality of spaced conductive areas thereon; said springs engaging said conductive areas; and a key of non-conductive material removably positioned in said slot, said key having a plurality of conductive inserts extending transversely therethrough and so positioned thereon that said inserts each engage predetermined opposed contact portions to electrically connect the same, said predetermined opposed contacts including contacts connected to certain of said conductive areas so that said inserts electrically connect all said certain conductive areas in series.

7. An electric lock as defined in claim 6 in which each of said circuit plate means includes a locking plate and an unlocking plate, each having a plurality of said conductive areas thereon comprising portions of a locking circuit and an unlocking circuit, respectively; the electrically conductive areas on the locking and unlocking plates being on the inwardly facing side of those plates, and openings in the electrically conductive area and plate of the innermost of the locking and unlocking plates, aligned with said springs, said openings being sufficiently large to permit certain of the electrically conductive springs to pass through said innermost plate to contact a conductive area in the outermost plate without making electrical contact with the conductive area in said innermost plate.

8. An electric lock as defined in claim 7 wherein said conductive springs are helical.

9. An electric lock as defined in claim 7 wherein said openings through the conductive areas and plate of the said innermost of said plates are provided in alignment with only certain of said springs.

10. An electric lock as defined in claim 7 wherein the number of openings through the said innermost plate is equal to the number of springs, with the exception of certain springs common to all locks, and each opening is aligned therewith, and in which certain springs have enlarged ends too large to pass through said openings, the outer ends of the openings in the spring plates being counterbored to accommodate the enlarged ends of the springs.

11. In an electric lock: a key plate having a slot extending through an edge thereof for the reception of a key; a pair of contact plates, one on each side of said key plate, said contact plates each having conductive contacts slidably mounted thereon and projecting into said key slot, each contact in one contact plate being opposed to but spaced from a contact in the other contact plate; a spring plate adjacent each contact plate and having openings therethrough aligned with said contact; a conductive spring in each opening and engaging its aligned contact; non-conductive circuit plate means adjacent each spring plate; each circuit plate means having a plurality of spaced conductive areas thereon; said springs engaging said conductive areas; and a key of non-conductive material removably positioned in said slot, said key having a plurality of conductive inserts extending transversely therethrough and so positioned thereon that said inserts each engage predetermined opposed contact portions to electrically connect the same, said predetermined opposed contacts including contacts connected to certain of said conductive areas so that said inserts electrically connect all said certain contact areas in series, said certain electrically conductive areas forming a part of an unlocking circuit and others of said electrically conductive areas forming a part of a locking circuit whereby a proper key inserted properly in the slot effects a connection between said certain of said electrically conductive areas in series to complete an unlocking circuit, and a proper key inserted improperly in the slot, or an improper key inserted in the slot, effects a connection between others of said electrically conductive areas in series to complete a locking circuit.

12. An electric lock as defined in claim 11 wherein said circuit plate means include a further conductor connected to one of said conductive areas for connection to a source of electric current; and first and second conductive leads connected, respectively to a conductive area of said unlocking circuit and a conductive area of said locking circuit.

13. An electric lock as defined in claim 12 wherein said some of said conductive areas are on the inner face of said circuit plate means and define said unlocking circuit; at least some of said conductive areas defining said unlocking circuit being in the form of elongated strips having branched portions; said branched portions being aligned with and engaging said springs.

14. An electric lock as defined in claim 12 wherein some of said conductive areas are on the outer face of said circuit plate means and define said locking circuit; some of said springs extending through said circuit plate means into contact with said some of said conductive areas.

References Cited by the Examiner

UNITED STATES PATENTS

| | | | |
|---|---|---|---|
| 1,635,028 | 7/27 | Burr et al. | 70—280 |
| 1,946,384 | 2/34 | Baril et al. | 70—280 |
| 1,948,217 | 2/34 | Goodwin | 70—280 |
| 2,057,301 | 10/36 | Golokow et al. | 200—42 |
| 2,057,532 | 10/36 | McDonald | 200—42 |
| 2,105,304 | 3/38 | Wagner | 200—44 |
| 2,473,664 | 6/49 | Taylor | 200—42 |
| 2,662,131 | 12/53 | Cerna et al. | 200—44 |
| 2,734,954 | 2/56 | Kidd | 200—46 |
| 2,894,082 | 7/59 | Collotta | 200—44 |

FOREIGN PATENTS

| | | |
|---|---|---|
| 501,743 | 2/20 | France. |

BERNARD A. GILHEANY, *Primary Examiner.*

A. H. KAMPE, *Examiner.*